United States Patent [19]

Marquardt

[11] Patent Number: 4,894,565
[45] Date of Patent: Jan. 16, 1990

[54] ASYNCHRONOUS DIGITAL ARBITER

[75] Inventor: Douglas E. Marquardt, San Jose, Calif.

[73] Assignee: American Microsystems, Inc., Eastlake, Ohio

[21] Appl. No.: 231,420

[22] Filed: Aug. 11, 1988

[51] Int. Cl.[4] .......................... H03K 5/26; H03K 17/28
[52] U.S. Cl. .................................... 307/518; 364/200; 328/154; 328/109; 340/825.5
[58] Field of Search .................. 328/154, 109, 110; 364/200, 900; 307/514, 518, 526, 527; 340/825.5

[56] References Cited

U.S. PATENT DOCUMENTS

| | | | |
|---|---|---|---|
| 4,339,808 | 7/1982 | North | 328/154 |
| 4,398,105 | 8/1983 | Keller | 307/514 |
| 4,415,972 | 11/1983 | Adcock | 364/200 |
| 4,423,384 | 12/1983 | DeBock | 307/243 |
| 4,620,118 | 10/1986 | Barber | 307/518 |

Primary Examiner—Stanley D. Miller
Assistant Examiner—Richard Roseen
Attorney, Agent, or Firm—Skjerven, Morrill, MacPherson, Franklin & Friel

[57] ABSTRACT

An asynchronous digital arbiter circuit suitable for use in computer systems applications requiring fast asynchronous arbitration between two asynchronous inputs. The arbiter resolves which of two input signals is to be granted access, and provides a busy signal to the source of the other input signal. The arbiter consists solely of standard digital logic circuit elements including logic gates, flip-flops, and inverters.

16 Claims, 4 Drawing Sheets

| a | SIGNAL ON 64, 66 FROM CIRCUIT 62 TO $\bar{R}$ OF D-TYPE FLIP FLOPS 10 AND 14 | e | DELAY FROM $\bar{R}$ TO $\bar{Q}$ OUTPUT OF D-TYPE FLIP FLOPS |
| --- | --- | --- | --- |
| b | SIGNAL ON 42, 44 | f | DELAY THROUGH GATES 124, 126 OR 128, 130 PAIR |
| c | SIGNAL ON 46, 48 | g | DELAY THROUGH CIRCUIT 18 |
| d | DELAY FROM SIGNAL ON 46 OR 48 THROUGH CIRCUIT 18 TO SIGNAL ON 50 | | |

ASYNCHRONOUS DIGITAL ARBITER

BACKGROUND OF THE INVENTION

This invention relates a digital signal arbiter which multiplexes access by two ports into a single port. The arbiter is totally digital and asynchronous.

Many electronic systems, such as computers, must resolve which of two competing inputs will receive priority. A typical case is a dual port memory controller where two asynchronous data input ports compete for access to a user-defined single port random access memory (RAM). The controller must resolve which of the two asynchronous signal inputs is the winner and gets access to RAM. The controller then signals that the other asynchronous signal input is the loser. The loser gets a busy signal to indicate it must wait for access to RAM.

It is desirable to perform this arbitration by totally digital means. Existing arbiters fall into two classes:

Synchronous arbitration using clocks. By definition, not suitable for this application where asynchronicity is required.

Asynchronous arbitration by non-linear (analog) techniques to solve the problem of meta-instability. These arbiters typically have hard-wired priority rules and imprecise guard band times during access switching. They also have the major disadvantage of including analog circuit elements.

SUMMARY OF THE INVENTION

The present invention is an asynchronous arbiter that is all digital, and includes only standard digital logic circuit elements. Therefore, the arbiter can be implemented in discrete logic, standard LSI, gate arrays, megacells, or standard cells.

The arbiter has two input terminals that each accept an asynchronous input signal. Each input terminal is connected to a D-type flip-flop that serves as a memory element. The two D-type flip-flops are each connected to a logic circuit consisting of several logic gates. The arbiter also includes two output logic circuits and a reset circuit. Each of the two output logic circuits is capable of generating an output signal to one of the providers of the input signals, indicating a busy signal. Thus the arbiter inhibits one of the input signals.

The present invention has the further advantage over the prior art of being more reliable, more predictable in its operation, and glitch-free.

DETAILED DESCRIPTION OF THE INVENTION

Figure 1:
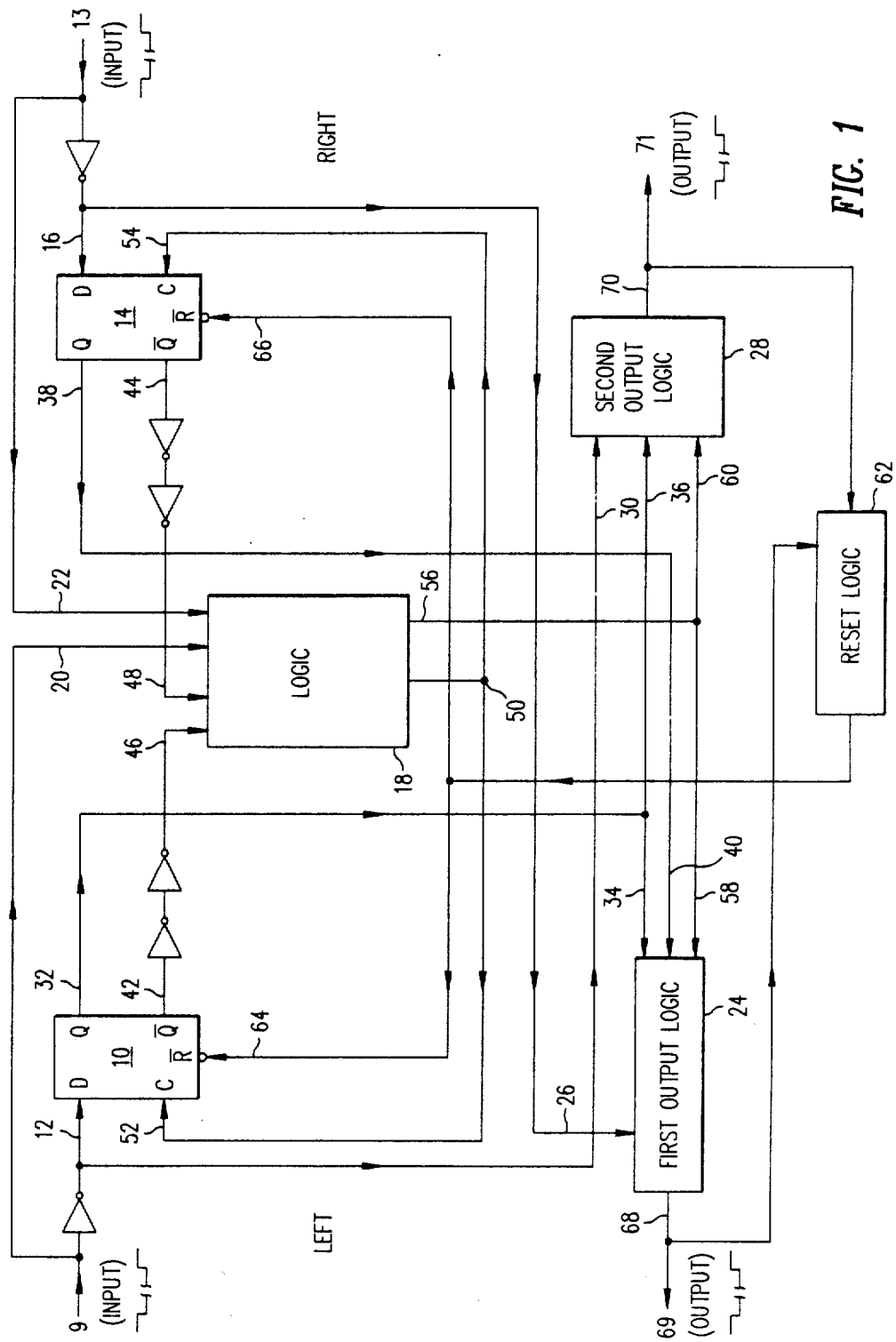
FIG. 1 is a block diagram of the present invention.

The arbiter is shown in block diagram form in FIG. 1. An asynchronous input signal 9 is provided to D-type flip-flop 10 at data (D) input terminal 12. A second asynchronous input signal 13 is provided to D-type flip-flop 14 at data (D) input terminal 16. The two input signals 9 and 13 also are provided to logic circuit 18 at, respectively, input terminals 20 and 22.

The second input signal 13 is provided to the first output logic circuit 24 at input terminal 26. The first input signal 9 is provided to the second output logic circuit 28 at input terminal 30.

The output (Q) terminal 32 of the first flip-flop is connected to input terminal 34 of first output logic circuit 24 and to input terminal 36 of second output logic circuit 28. The output (Q) terminal 38 of the second flip-flop 14 is connected to input terminal 40 of the first output logic circuit 24. The inverted output ($\overline{Q}$) terminal 42 of the first flip-flop 10 and the inverted output ($\overline{Q}$) terminal 44 of the second flip-flop 14 are connected to logic circuit 18 at, respectively, input terminals 46 and 48.

Output terminal 50 of logic circuit 18 is connected to input clock (C) terminal 52 of the first flip-flop 10, and is also connected to input clock (C) terminal 54 of the second flip-flop 14. A second output terminal 56 of logic circuit 18 is connected to the first output logic circuit 24 at input terminal 58 and to the second output logic circuit 28 at input terminal 60.

A reset circuit 62 is provided that is connected to the first flip-flop 10 at reset ($\overline{R}$) terminal 64 and to the second flip-flop 14 at reset ($\overline{R}$) terminal 66.

The first output logic circuit 24 has an output terminal 68 to provide a busy signal 69 to inhibit the first input signal 9. The second output logic circuit 28 has an output terminal 70 to provide a busy signal 71 to inhibit the second input signal 13.

Figure 2:
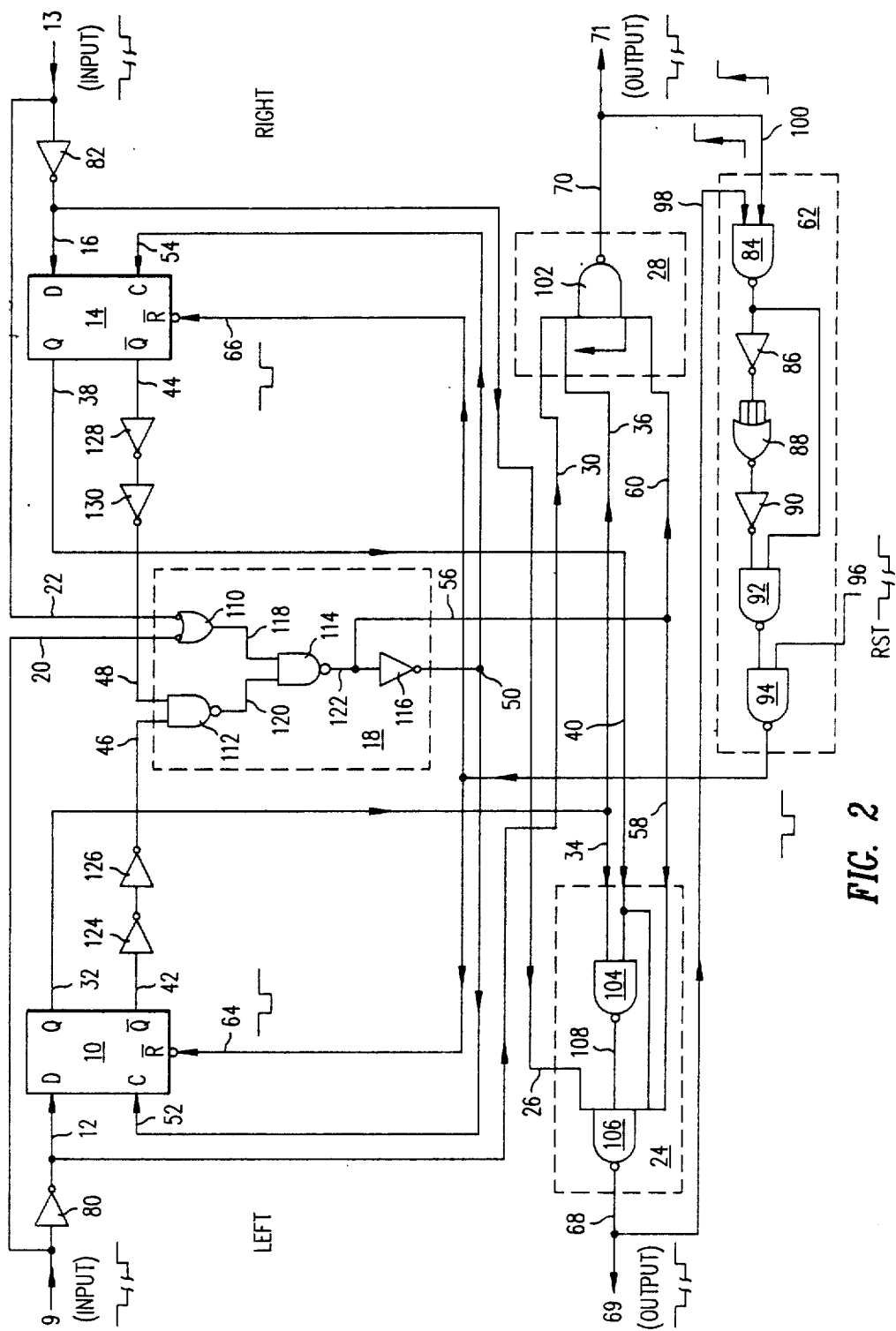
FIG. 2 is a schematic diagram of the present invention.

Further detail of the arbiter is shown in FIG. 2.
Inverter 80 connects first input signal 9 to data (D) input terminal 12. Similarly, inverter 82 connects second input signal 13 to data (D) input terminal 16.

The reset circuit 62 consists, in sequence, of AND gate 84, inverter 86, NOR gate 88, inverter 90, NAND gate 92, and AND gate 94. AND gate 94 has external reset (RST) input 96. Reset circuit 62 also has as inputs on input terminals 98 and 100, respectively, first output signal 69 and second output signal 71.

The second output logic circuit 28 consists of NAND gate 102. The first output logic circuit 24 consists of NAND gate 104 and NAND gate 106, connected so that the inputs to NAND gate 104 are from output (Q) terminal 32 and from output (Q) terminal 38. NAND gate 106 has as inputs the output 108 of NAND gate 104 and also the inverted second input signal 13, the signal on output (Q) terminal 38, and the signal on output terminal 56 of the logic circuit 18.

The logic circuit 18 consists of NAND gate 110, AND gate 112, NAND gate 114, and inverter 116. NAND gate 110 has as inputs, terminals 20 and 22. AND gate 112 has as its inputs terminals 46 and 48. The outputs 118 and 120 of gates 110 and 112 are connected as inputs to NAND gate 114. The output 122 of NAND gate 114 is connected to terminal 56 and also is an input to inverter 116.

The output ($\overline{Q}$) terminal 42 is converted to two inverters 124 and 126 in series. Similarly, the output ($\overline{Q}$) terminal 44 is connected to two inverters 128 and 130 in series.

The operation of the arbiter is as follows:
In one embodiment, the arbiter is an integrated circuit and used as a controller for RAM. There are two RAM ports, left and right. The input signals are, $\overline{CSR_L}$ (Chip Select RAM-left) and $\overline{CSR_R}$ (Chip Select RAM-right), where left and right designate the two RAM ports. Thus $\overline{CSR_L}$ corresponds to input signal 9 in FIGS. 1 and 2. $\overline{CSR_R}$ corresponds to input signal 13 in FIGS. 1 and 2. The waveform symbols on FIGS. 1 and 2 denote negative-going pulses and trailing-edge clock and reset pulses. Once arbitration is complete, the arbiter sends out a busy signal to the loosing (non-selected) port. Thus $\overline{BUSY_L}$ (busy-left) is the busy signal corresponding to output signal 69 in FIGS. 1 and 2. $\overline{BUSY_R}$ (busy-right) corresponds to output signal 71 in FIGS. 1 and 2.

In this embodiment using a standard 2 micron CMOS gate array technology with TTL Input/Output, the arbiter is provided a DC supply voltage of 5.0 volts±10% and operates at an ambient temperature of 25° C. Under these typical conditions, the operating parameters of the arbiter are as follows (corresponding to FIG. 3):

| PARAMETER TABLE (see FIGS. 3,4,5) | | | | |
|---|---|---|---|---|
| Parameter | Parameter Number | Timing - nanoseconds (ns) | | |
| | | Minimum | Typical | Maximum |
| CSR cycle time | 1 | — | >50 | — |
| $\overline{BUSY}$ access time from CSR | 2 | 15 | 25 | 55 |
| $\overline{BUSY}$ control signal release time | 3 | 5 | 10 | 20 |
| arbitration priority set up time | 4 | — | 5 | 10 |

From the Parameter Table, parameter number 4 (also see FIG. 4) states that under *typical* conditions, if input signals $\overline{CSR_L}$ and $\overline{CSR_R}$ are separated by greater than 5 ns, then whichever signal ($\overline{CSR_L}$, $\overline{CSR_R}$) was first, will be the winner of the arbitration, and the losing signal will have its $\overline{BUSY}$ output activated. If parameter 4 is not met under *typical* conditions, in which input signals $\overline{CSR_L}$ and $\overline{CSR_R}$ are *not* separated by at least 5 ns (typical conditions), then $\overline{CSR_L}$ is *biased* to be the winner of the arbitration and thus $\overline{BUSY_R}$ will be activated. If parameter 4 is not met as stated above, *and* for some reason the supply voltage or the ambient temperature are higher or lower than the nominal value specified above, $\overline{CSR_L}$ is not necessarily the winner. However, either $\overline{CSR_L}$ or $\overline{CSR_R}$ will be the winner. Thus proper arbitration will occur even outside the nominal operating conditions. This is a satisfactory outcome, since it does not matter which input is selected as the winner by the arbiter as long as one is definitely chosen. Thus the arbiter is "meta-stable."

Figure 3:
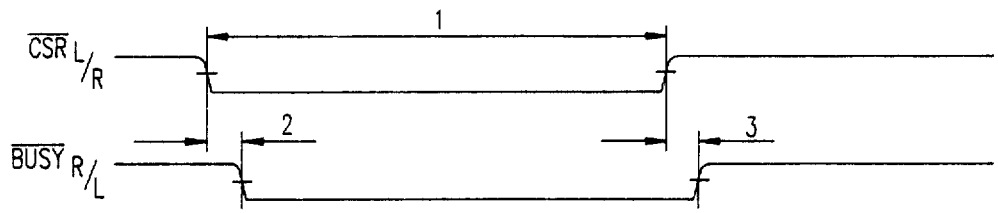
FIGS. 3–6 are timing diagrams of the circuit of FIGS. 1 and 2.

FIG. 3 shows a timing diagram for the input ($\overline{CSR}$) and output ($\overline{BUSY}$) signals. The emphasized (bolded) numerals 1 2, 3, 4 designate the parameters as numbered in the Parameter Table, *supra*. In FIG. 3, each timing line refers to *both* ports. Thus $\overline{CSR_{L/R}}$ designates $\overline{CSR_L}$ or $\overline{CSR_R}$.

Figure 4:
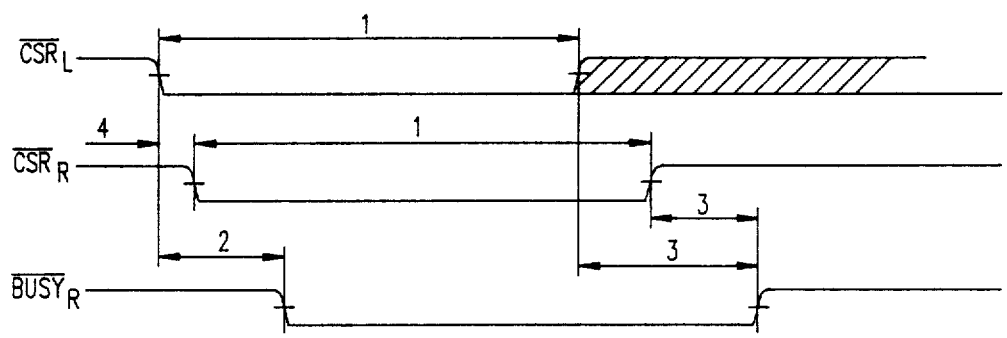
Figure 5:
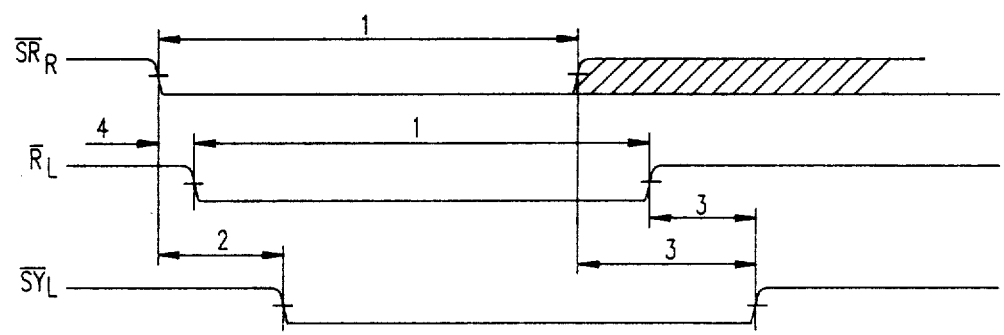

At nominal operating conditions, FIG. 4 shows the timing diagram of $\overline{CSRHD\ L}$ winning the arbitration, and FIG. 5 shows the timing diagram of $\overline{CSR_R}$ winning the arbitration.

DETAILED THEORY OF OPERATION

The following discussion presents the detailed operation of the arbiter circuit as shown in FIG. 2.

Upon reset (RST, signal 96), terminals 66 and 64 receive logic low signals (hereinafter referred to as "low"), which reset D-type flip-flops 10 and 14 creating a logic high (hereafter referred to as "high") at inputs 46 and 48. Also logic low is created at the Q outputs 32 and 38 which forces a high output at gates 102 and 106 respectively.

After reset, if either asynchronous signal inputs 9 or 13 go low, then a high is created at output 118 which is NANDed by gate 114 with the signal on output 120 (high from inputs 46 and 48 being high from reset) which forces the signal on output 122 of gate 114 to go low. The signal on output 122 goes low to momentarily *disable* gates 102 and 106 by the signal on terminal 56 while arbitration is completed.

The signal on output 122 is inverted by gate 116 and used as a common clock signal on terminal 50 to clock the D-type flip-flops 10 and 14 by clock signals to inputs 52 and 54 respectively. This latches the state of the asynchronous signal inputs of 9 and/or 13 at terminals 12 and 16 of the D-type flip-flops.

Any possible meta-instability at the D-type flip-flops will eventually be resolved with one or the other of Q outputs at terminals 32 and 38 going high. This will cause the output signals on either terminal 46 or 48 to go low, and force the signal on output 120 low which forces the signal on output 122 high and the signal on output 50 low. Also, the signal on output 56 is forced high, enabling gates 102 and 106. Then for example, if the signal on output 32 was latched high and the signal on output 38 was latched low and since the signal at input 30 would be high, gate 102 would force signal 71 low. This would be the case where signal input 9 (left port) goes low and wins arbitration and forces the (right port) signal output 71 to go low.

Gate 104 is used to resolve the conflict where *both* signal inputs 9 and 13 go low within a defined time window of one another (see parameter 4 of Parameter Table, under typical conditions) and hence both signals are latched in their respective D-type flip-flops, forcing the Q-output signals on outputs 32 and 38 to both go high simultaneously. In this case gate 104 senses this and forces output signal 69 of gate 106 high, while allowing output signal 71 of gate 102 to go low. This means that under these circumstances, the (left port) input signal 9 is *biased* to win the arbitration, under typical conditions.

The D-type flip-flops are cleared, by the *trailing*, low-to-high edge of output signal 69 or 71. This is done by creating a reset pulse by reset circuit 62. This reset pulse is a negative-going low pulse which reset the D-type flip-flops by signals on reset input terminals 64 and 66. The port (left or right) that wins the arbitration always causes this pulse from reset circuit 62 when its input signal goes high again which causes the signal on inputs 12 or 16 to go low and forces the output signals 71 or 69 from gates 102 or 106 respectively, to go high. This trailing, low-to-high edge of output signal 71 or 69 causes reset circuit 62 to produce the reset pulse. The negative reset pulse of reset circuit 62 can be lengthened or shortened by adding more delay elements similar to delay gate 90, 88, and 86.

When both D-type flip-flops 10 and 14 are reset by reset circuit 62, by the release (low to high) of input signal 9 or 13, then if the input signal that originally lost the arbitration, is still low, then logic circuit 18 will operate as previously discussed and create a new clock signal on output 50.

Figures 6, 6A:
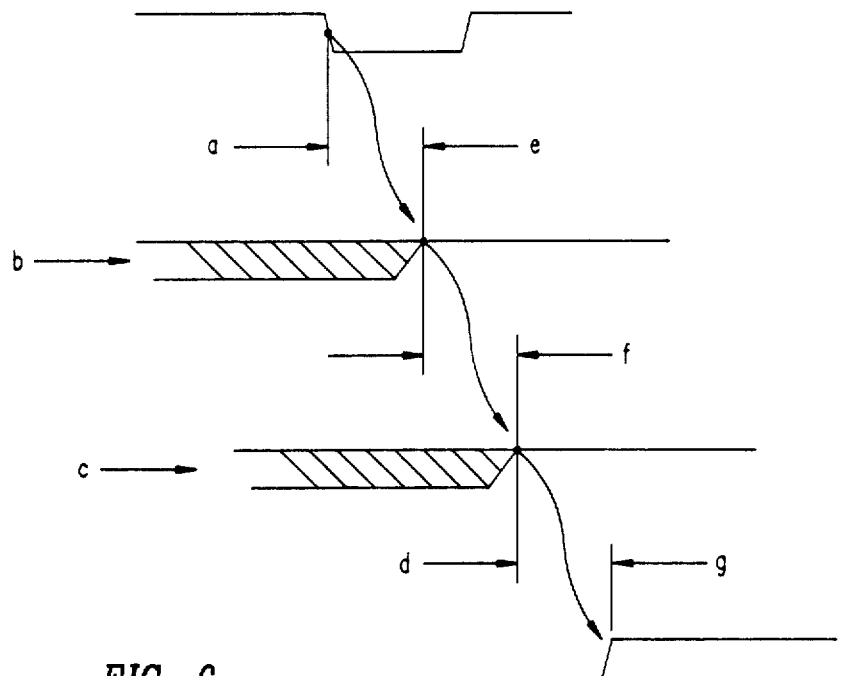

The critical timing of the basic circuit is to keep the reset pulse from reset circuit 62 as short as possible, but yet long enough to reset the D-type flip-flops 10 and 14 of the particular embodiment. This reset pulse causes the signals on outputs 42 and 44 to go high. The delay path from output 42 to input 46 or from output 44 to input 48 added to the delay path from input 46 or input 48 to output 50 through logic circuit 18, must be longer than the pulse width of the reset pulse of reset circuit 62 (see FIG. 6).

If this reset pulse is not of the right length as described supra., more delay can be added by use of gates similar to delay gates 124, 126 and 128, 130.

The above description of the invention is illustrative and not limiting. Further modifications and equivalents may be employed without departing from the true spirit and scope of the invention.

I claim:
1. An asynchronous arbiter comprising:
   first and second input terminals for receiving the asynchronous signals to be arbitrated;
   a first flip-flop having an input terminal connected by an inverter to the first input terminal, and having a clock terminal, an output terminal, an inverted output terminal, and a reset terminal;
   a second flip-flop having an input terminal connected by an inverter to the second input terminal, and having a clock terminal, an output terminal, an inverted output terminal, and a reset terminal;
   a first and second output logic means each having an output terminal and input terminals;
   a logic means having input terminals and output terminals;
   means connecting each of the first and second input terminals to, respectively, a first and a second input terminal of the logic means;
   means connecting the inverted output terminals of the first and second flip-flops to, respectively, a third and a fourth input terminal of the logic means;
   means connecting the input terminal of the first flip-flop to a first input terminal of the second output logic means;
   means connecting the input terminal of the second flip-flop to a first input terminal of the first output logic means;
   means connecting a first output terminal of the logic means to the clock terminals of the first and second flip-flops;
   means connecting a second output terminal of the logic means to a second input terminal of, respectively, the first and second output logic means;
   means connecting the output terminal of the first flip-flop to a third input terminal of, respectively, the first and second output logic means; and
   means connecting the output terminal of the second flip-flop to a fourth input terminal of the first output logic means, so the output terminals of the first and second output logic means provide arbitrating signals between the first and second input signals.
2. The arbiter of claim 1, further comprising a reset means having three reset input terminals and a reset output terminal, two of the reset input terminals being connected, respectively, to the output terminals of the first ad second output logic means, and the reset output terminal being connected to the reset terminals of the first and second flip-flops; and the third reset input terminal being capable of receiving a reset signal.
3. The arbiter of claim 1, wherein the second output logic means comprises a NAND gate.
4. The arbiter of claim 1, wherein the first output logic means comprises first and second NAND gates, the first NAND gate having two input terminals which are the third and fourth input terminals of the first output logic means, and having an output terminal; the second NAND gate having four input terminals the first of which is connected to the output of the first NAND gate and the remainder of which are the first, second, and fourth input terminals of the first output logic means; and having an output terminal which is the output terminal of the first logic means.
5. The arbiter of claim 1, wherein the logic means comprises:
   a NAND gate having two input terminals which are the first and second input terminals of the logic means, and having an output terminal;
   an AND gate having two input terminals which are the third and fourth input terminals of the logic means, and having an output terminal;
   a second NAND gate having two input terminals which are connected to, respectively, the output terminals of the first AND gate and the NAND gate, and having an output terminal connected to the second output terminal of the logic means; and
   an inverter connected between the output terminal of the second NAND gate and the first output terminal of the logic means.
6. The arbiter of claim 1, further comprising two inverters connected in series in the means connecting, respectively, the inverted outputs of the first and second flip-flops to the third and fourth input terminals of the logic means.
7. The arbiter of claim 1, wherein the clock terminals of the first and second flip-flops are both connected to an output terminal of the logic means.
8. The arbiter of claim 1, wherein the first and second flip-flops are D-type flip-flops.
9. The arbiter of claim 1, wherein the arbiter is an integrated circuit.
10. An asynchronous arbiter comprising:
    a first memory element for receiving and storing a first input signal;
    a second memory element for receiving and storing a second input signal
    a logic means;
    means for providing the stored contents of the first and second memory elements to the logic means;
    first output logic means for inhibiting the first input signal;
    second output logic means for inhibiting the second input signal;
    means for providing an output of the logic means to the first and second memory elements so as to change the stored contents of the memory elements;
    means for providing an output of the logic means to the first and second output logic means;
    means for providing the stored contents of the first memory element to both the first and second output logic means; and
    means for providing the stored contents of the second memory element to the first output logic means.
11. The arbiter of claim 10 further comprising means for resetting the state of the contents of the first and second memory elements.
12. The arbiter of claim 10 wherein the means for providing an output of the logic means to the first and second memory elements is a clock signal provided to the memory elements.
13. The arbiter of claim 10 further comprising means for providing the first and second input signals to the logic means.
14. The arbiter of claim 10, further comprising means for providing the first input signal to the second output logic means, and means for providing the second input signal to the first output logic means.
15. The arbiter of claim 10, wherein the first and second memory elements are D-type flip-flops.
16. The arbiter of claim 10, wherein said arbiter is an integrated circuit.

* * * * *